(12) United States Patent
Takahashi et al.

(10) Patent No.: US 7,102,858 B2
(45) Date of Patent: Sep. 5, 2006

(54) THIN-FILM ELECTRODE LAYER INCLUDING β-TA AND THIN-FILM MAGNETIC HEAD USING THE SAME

(75) Inventors: Akira Takahashi, Niigata-ken (JP); Jun Takahashi, Niigata-ken (JP); Yuko Kawasaki, Niigata-ken (JP); Kenji Honda, Niigata-ken (JP); Naohiro Ishibashi, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 428 days.

(21) Appl. No.: 10/369,058

(22) Filed: Feb. 18, 2003

(65) Prior Publication Data
US 2003/0156359 A1 Aug. 21, 2003

(30) Foreign Application Priority Data
Feb. 18, 2002 (JP) .................... 2002-039783

(51) Int. Cl.
*B11B 5/39* (2006.01)

(52) U.S. Cl. ...................................... 360/322

(58) Field of Classification Search ............... 360/322
See application file for complete search history.

(56) References Cited

U.S. PATENT DOCUMENTS

| 5,268,806 A | 12/1993 | Goubou et al. |
| 5,491,600 A | 2/1996 | Chen et al. |
| 5,883,764 A | 3/1999 | Pinarbasi |
| 6,359,760 B1 | 3/2002 | Kanno |
| 6,713,801 B1 * | 3/2004 | Sin et al. .................... 257/295 |

FOREIGN PATENT DOCUMENTS

EP         0 590 905 A2      4/1994

\* cited by examiner

*Primary Examiner*—A. J. Heinz
(74) *Attorney, Agent, or Firm*—Brinks Hofer Gilson & Lione

(57) ABSTRACT

A thin-film electrode layer having a superior electromigration resistance is disclosed. The thin-film electrode layer includes a first base layer composed of β-Ta, a main conductive layer composed of Au, and a protective layer. The protective layer is a composite of a Cr sublayer and an α-Ta sublayer. A thin-film magnetic head having the thin-film electrode layers and a method for forming electrodes in the thin-film magnetic head are also disclosed.

7 Claims, 17 Drawing Sheets

THIN-FILM ELECTRODE LAYER INCLUDING β-TA AND THIN-FILM MAGNETIC HEAD USING THE SAME

BACKGROUND OF THE INVENTION

1. Field of the Invention

The present invention relates to a thin-film electrode layer for supplying an electric current to a magnetoresistive element, a thin-film magnetic head using a thin-film electrode layer, and a method for forming electrodes in a thin-film magnetic head.

2. Description of the Related Art

Thin film magnetic heads having magnetoresistive elements include thin-film electrode layers for supplying electric current to the magnetoresistive elements. When electric current is supplied to a magnetoresistive element, the resistance of the magnetoresistive element changes, and a leakage magnetic field from a recording medium can be detected by a change in voltage due to a change in resistance. The thin-film magnetic head preferably has thin-film electrode layers composed of a metal having a small resistivity, such as gold, so as to reduce the electrical resistance of components other than the magnetoresistive element.

FIG. 29 is a cross-sectional view showing the structure of electrodes of a conventional thin-film magnetic head. Each of thin-film electrode layers E' is a composite consisting of a first tantalum (Ta) layer 31', a gold (Au) layer 33', and a second Ta layer 34', stacked in that order. The first Ta layer 31' prevents the Au layer 33' from diffusing, and the second Ta layer 34' prevents smearing.

However, the above-described conventional Ta/Au/Ta electrode structure has a problem with electromigration (EM) resistance. When a current is supplied to the thin-film electrode layer E' for a long period of time, i.e., when the thin-film magnetic head is used for long time, Au atoms of the Au layer 33' drift due to collisions with electrons moving in the thin-film electrode layer E'. For example, when current flows in I direction in FIG. 29, i.e., from right to left in the drawing of FIG. 29, electrons (e⁻) travel from left to right, thereby producing voids inside an end region S of the thin-film electrode layer E'. This increases the electrical resistance of the thin-film electrode layer E' despite the use of gold which has a small resistivity.

SUMMARY OF THE INVENTION

An object of the present invention is to provide a thin-film electrode layer having a superior EM resistance, a thin-film magnetic head using a thin-film electrode layer, and a method for making a thin-film electrode in a thin-film magnetic head.

A change in resistance in the thin film electrode layers is inhibited by forming a chromium (Cr) layer directly under a gold (Au) layer which functions as the main conductive layer of the thin-film electrode layer. An aspect of the present invention provides a thin-film electrode layer including a base layer comprising a first base sublayer composed of beta-tantalum (β-Ta) and a second base sublayer composed of Cr; a main conductive layer composed of Au; and a protective layer, in which the second base sublayer is disposed between the first base sublayer and the main conductive layer.

This structure inhibits a resistance change in the main conductive layer due to the presence of the second base sublayer. Moreover, the resistivity of the second base sublayer is decreased by the presence of the first base sublayer.

The protective layer may be a composite of a chromium sublayer and an alpha-tantalum (α-Ta) sublayer, stacked in that order on the main conductive layer; a composite of a β-Ta sublayer and a Cr sublayer, stacked in that order on the main conductive layer; or a single layer of Cr or β-Ta.

The above-described thin-film electrode layers can be incorporated in a thin-film magnetic head including a magnetoresistive element. Another aspect of the present invention provides a thin-film head including thin film electrode layers and a magnetoresistive element, wherein an electric current is supplied to the magnetoresistive element via the thin film electrode layers. A magnetic field detecting layer of the magnetoresistive element may be a permanent magnet bias type or an antiferromagnetic bias type. When the thin-film electrode layers are applied on a permanent magnet bias thin-film magnetic head including two permanent magnet layers at two sides of the magnetoresistive element, the thin-film electrode layers overlay at least the permanent magnet layers When the thin-film electrode layers are applied in an antiferromagnetic bias thin-film magnetic head comprising antiferromagnetic bias layers formed on the magnetic field detecting layer, the thin-film electrode layers are disposed on the antiferromagnetic bias layers. The thin-film magnetic head may have a lead overlaid structure in which the magnetic field detecting layer is overlaid by the thin-film electrode layers, but is not limited to this structure Yet another aspect of the present invention provides a method for making an electrode of a thin-film magnetic head, including the steps of (a) forming a first base sublayer comprising β-Ta on a magnetoresistive element and on permanent magnet layers disposed at the two sides of the magnetoresistive element; (b) forming a second base sublayer composed of Cr on the first base sublayer; (c) forming a main conductive layer composed of Au on the second base sublayer; (d) forming at least one protective layer on the main conductive layer at regions outside a track width region of the magnetoresistive element; (e) performing reactive ion etching on the main conductive layer using the at least one protective layer as a mask to remove a portion of the main conductive layer that lies inside the track width region; and (f) performing ion milling on the first base sublayer and the second base sublayer to remove portions of the first base sublayer and the second base sublayer that lie inside the track width region.

According to the method, each end portion of the thin-film electrode layer near the magnetoresistive element M can have a sufficient thickness, and the layers at the end portions can be sufficiently adhered to each otherwhich allows the resistance of the thin-film electrode layers to be effectively decreased.

In said step (e) of the above-described method, the second base sublayer may be used as an etching stopper. The protective layer is preferably formed by a lift-off process. The protective layer may have a single-layer structure composed of Cr, or may be a composite including a β-Ta sublayer and a Cr sublayer stacked in that order.

Yet another aspect of the present invention as applied to a permanent magnet bias thin film magnetic head provides a method for making electrodes of a thin-film magnetic head, including the steps of (g) forming a first base sublayer comprising β-Ta on an antiferromagnetic bias layer disposed on a magnetoresistive element; (h) forming a second base sublayer composed of Cr on the first base sublayer; (i) forming a main conductive layer composed of Au on the second base sublayer; (j) forming a protective layer composed of β-Ta on the main conductive layer; (k) forming mask layers composed of Cr on the protective layer at portions outside a track width region of the magnetoresistive element; (l) performing reactive ion etching on the protective layer and the main conductive layer using the mask layers to remove portions of the protective layer and the main conductive layer that lie inside the track width region; and (m) performing ion milling on the first base sublayer and the second base sublayer using the protective layer as a mask to remove portions of the first base sublayer and the second base sublayer that lie inside the track width region.

In said step (l) above, the second base sublayer may be used as an etching stopper. In said step (k), the mask layer may be formed by a lift-off process. Since the protective layer functions as a mask during the ion milling, the thickness thereof is sufficiently large so that the protective layer is not completely removed during the reactive ion etching and the ion milling.

DESCRIPTION OF THE PREFERRED EMBODIMENTS

Figure 1:
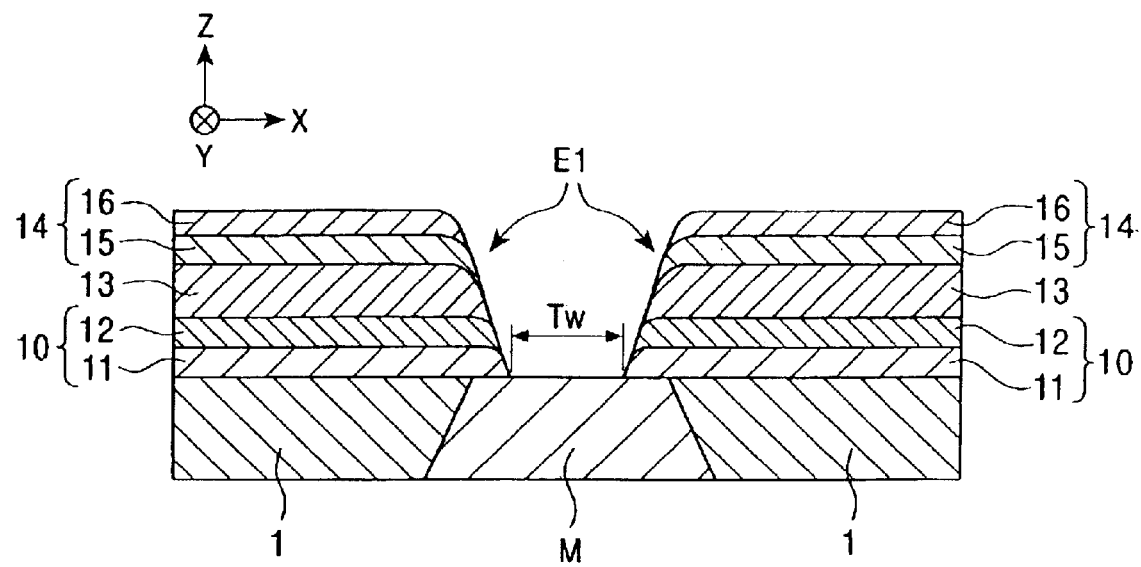
FIG. 1 is a schematic cross-sectional view of the structure of thin-film electrode layers according to a first embodiment of the present invention when viewed from the face that opposes a recording medium.

The present invention will now be described with reference to the drawings. In all of the drawings, the X direction indicates the track width direction, the Y direction indicates the direction of a leakage magnetic field from a recording medium, and the Z direction indicates the moving direction of the recording medium and the stacking direction of thin-film electrode layers.

FIGS. 1 to 17 show embodiments of thin-film electrode layers E (E1–E4) incorporated into thin-film magnetic heads of a permanent magnet bias type according to embodiments of the present invention. Each thin-film magnetic head includes a magnetoresistive element M, thin-film electrode layers E for supplying an electric current to the magnetoresistive element M, and permanent magnet layers 1 disposed at the two sides of the magnetoresistive element M in the track width direction. The thin-film electrode layers E are disposed on top of the permanent magnet layers 1 and at the two sides of the magnetoresistive element M (lead overlaid structure). Although not shown in the drawing, an insulating layer is formed on the top of each thin film electrode E, and an upper shield layer is formed on the insulating layer. Another insulating layer is formed on the bottom of each thin film electrode E and a lower shield layer is formed on the insulating layer, although this also is not shown.

First Embodiment

FIG. 1 is a schematic cross-sectional view of the structure of thin-film electrode layers E1 according to a first embodiment of the present invention when viewed from the face that opposes a recording medium. Each of the thin-film electrode layers E1 is formed by stacking metal layers and is constituted from a base layer 10 disposed on the permanent magnet layer 1 and part of the magnetoresistive element M; a main conductive layer 13 composed of gold; and a protective layer 14 formed on the main conductive layer 13. The base layer 10 prevents the diffusion of the main conductive layer 13. The protective layer 14 prevents smearing, i.e., sagging, of the main conductive layer 13 that occurs during polishing the X-Z plane, which is the recording-medium opposing face. When smearing of the main conductive layer 13 is prevented using the protective layer 14, the upper shield layer (not shown) stacked on the top of the thin-film electrode layer E1 with the insulating layer therebetween is prevented from coming into contact with the thin-film electrode layer E1, thereby preventing short-circuiting in the thin-film electrode layer E1.

Figure 26:
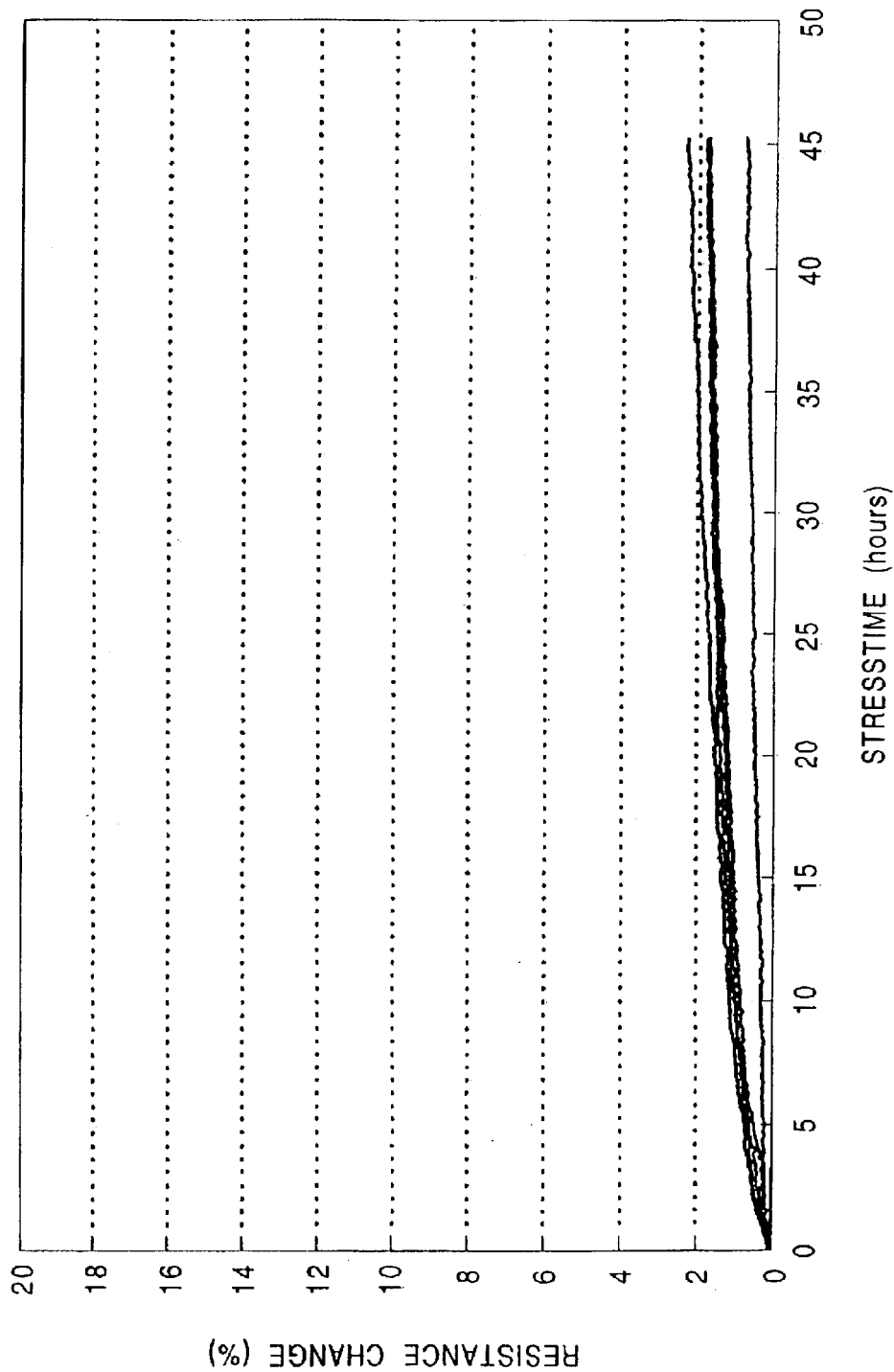
FIG. 26 is a graph showing electromigration (EM) characteristics of the thin-film electrode layers of EXAMPLE 1.
Figure 27:
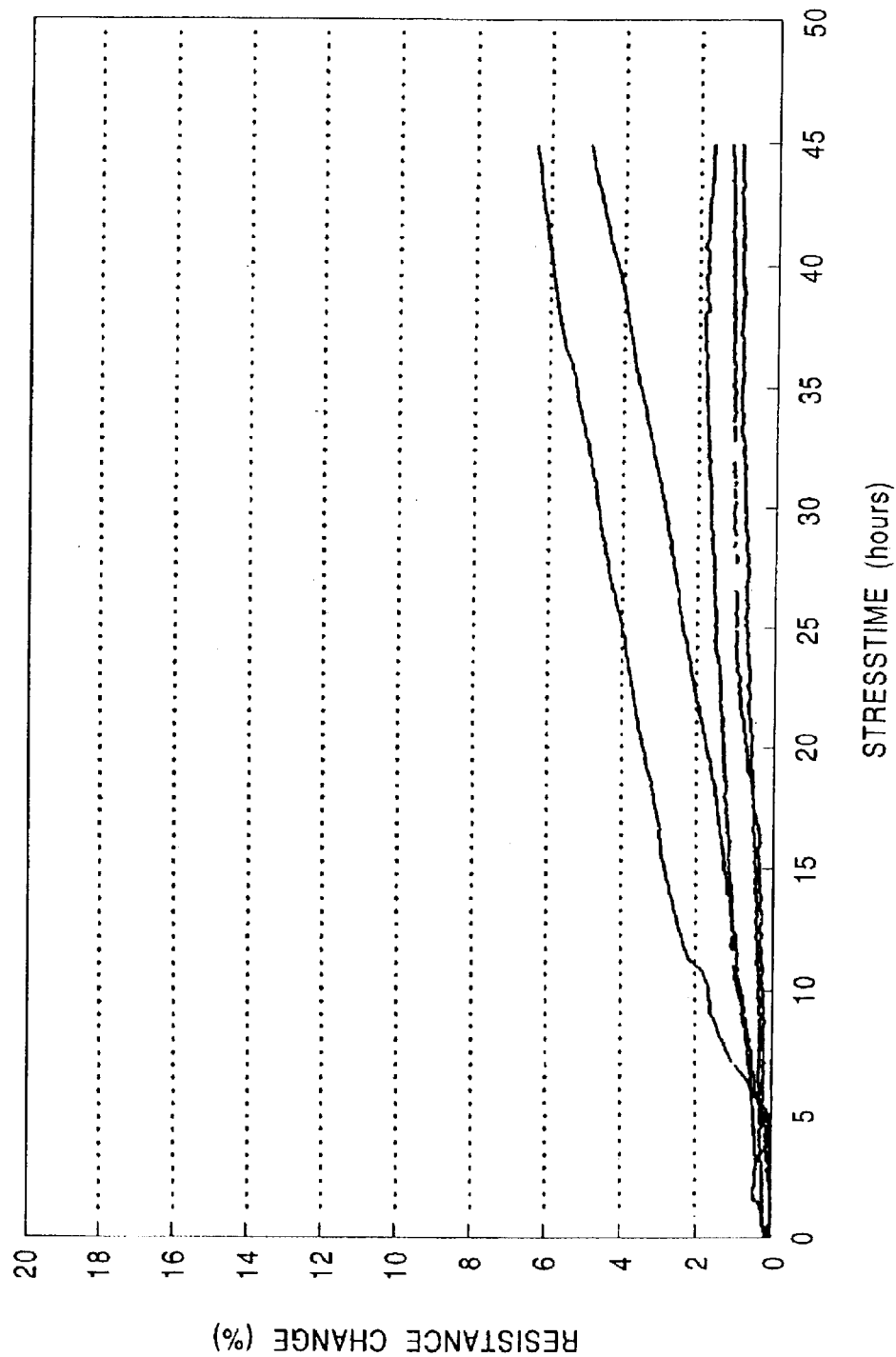
FIG. 27 is a graph showing electromigration (EM) characteristics of the thin-film electrode layers of EXAMPLE 2.
Figure 28:
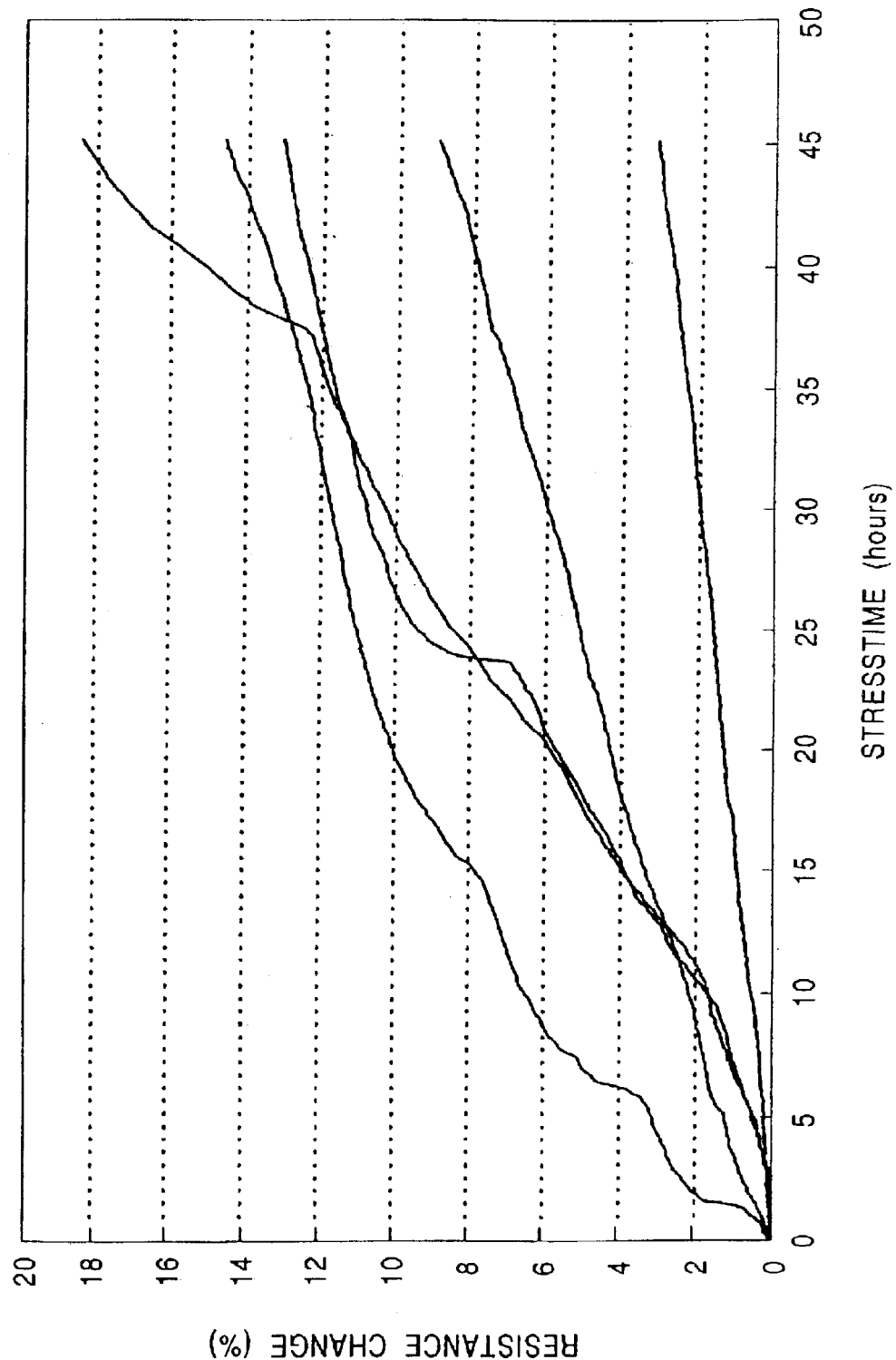
FIG. 28 is a graph showing electromigration (EM) characteristics of the thin-film electrode layers of COMPARATIVE EXAMPLE.

The base layer 10 of the thin-film electrode layer E1 is constituted from a first base sublayer 11 composed of β-Ta and a second base sublayer 12 composed of Cr and disposed between the first base sublayer 11 and the main conductive layer 13. When the chromium layer, i.e., the second base sublayer 12, is disposed directly under the main conductive layer 13, the resistance of the thin-film electrode layer E1 can be prevented from changing even after the thin-film electrode layer E1 is energized for a long time, thereby improving the electromigration (EM) resistance, as shown in FIGS. 26 to 28. Presumably, the reasons for this are that the adhesion of the Cr layer to the Au layer is high, and Au atoms are prevented from moving due to the presence of Cr atoms even when electrons collide with Au atoms.

In the thin-film electrode layer E1, the first base sublayer 11 composed of β-Ta is disposed directly under the second base sublayer 12. Thus, Cr atoms constituting the second base sublayer 12 have high crystal orientation, and the resistivity of the second base sublayer 12 is decreased. Note that β-Ta belongs to a tetragonal system.

Moreover, in the thin-film electrode layer E1, a Cr sublayer 15 is formed on the main conductive layer 13 so as to sandwich the Au main conductive layer 13 by two chromium layers, namely, the Cr sublayer 15 and the second base sublayer 12. The Cr second base sublayer 12 and the Cr sublayer 15 have a bcc (body-centered cubic) structure. An α-Ta sublayer 16 is formed on the Cr sublayer 15. The Cr layer 15 also has a function of bonding the main conductive layer 13 to the α-Ta sublayer 16. The Cr sublayer 15 and the α-Ta sublayer 16 constitute the protective layer 14. The α-Ta sublayer 16 has a Ta low-resistivity phase of a bcc structure. In particular, the volume resistivity thereof at 300° K. is approximately 20 μΩ·cm, and the α-Ta sublayer 16 is suited for use as an electrode in a thin-film magnetic head. Moreover, the α-Ta sublayer 16 is highly resistant against electromigration (EM), corrosion, and scratching. Thus, the α-Ta sublayer 16 can effectively prevent smearing of the main conductive layer 13 without significantly increasing the resistance of the thin-film electrode layer E1.

The process of forming the thin-film electrode layers E1 will now be described. FIGS. 2 to 7 are schematic cross-sectional views of the steps for forming the thin-film electrode layers E1 viewed from the recording-medium-opposing face.

Figure 2:
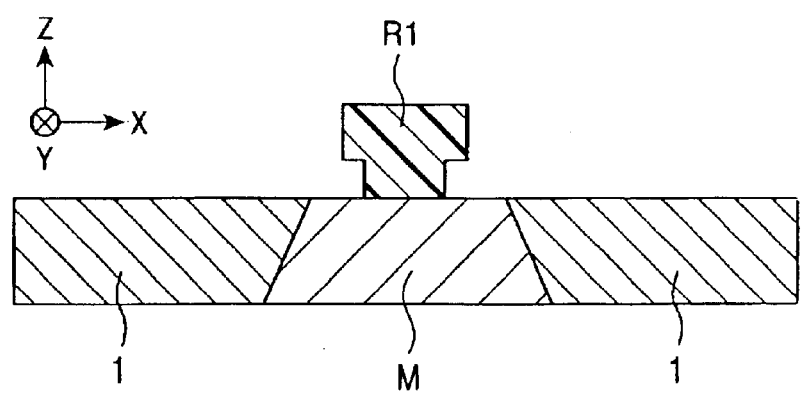
FIG. 2 is a schematic cross-sectional view showing a step of a method for making the thin-film electrode layers shown in FIG. 1 when viewed from the face that opposes a recording medium.

First, a pattern for securing a track width region Tw of the magnetoresistive element M is formed on the magnetoresistive element M and the permanent magnet layers 1. Next, the first base sublayer 11 is formed, the second base sublayer 12 is formed, the main conductive layer 13 is formed, the Cr sublayer 15 is formed, and finally, the α-Ta sublayer 16 is formed by a lift-off process at regions outside the track width region (Tw) as shown in FIG. 1. In particular, a resist R1 having an reversed shape of the thin-film electrode layers to be formed is formed on the magnetoresistive element M, as shown in FIG. 2.

Figure 3:
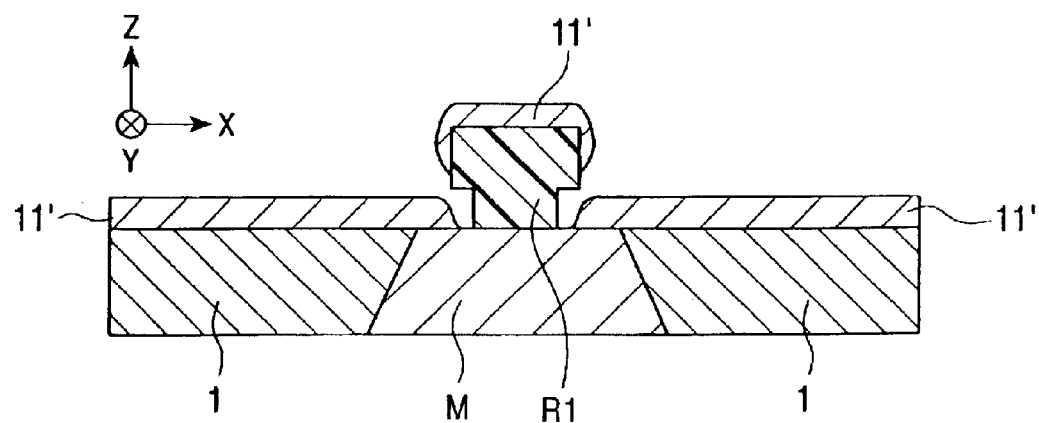
FIG. 3 is a schematic cross-sectional view showing a step subsequent to the step shown in FIG. 2 when viewed from the face that opposes a recording medium.
Figure 4:
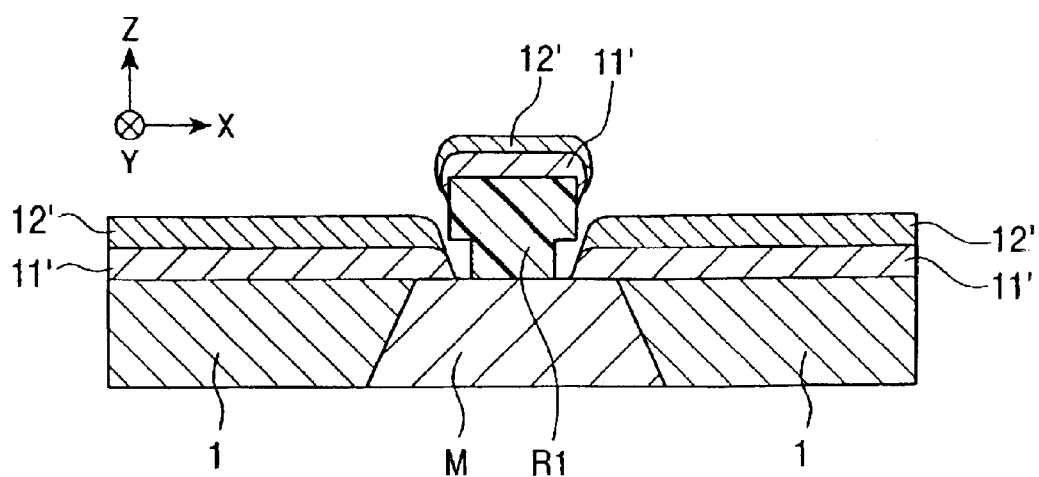
FIG. 4 is a schematic cross-sectional view showing a step subsequent to the step shown in FIG. 3 when viewed from the face that opposes a recording medium.
Figure 5:
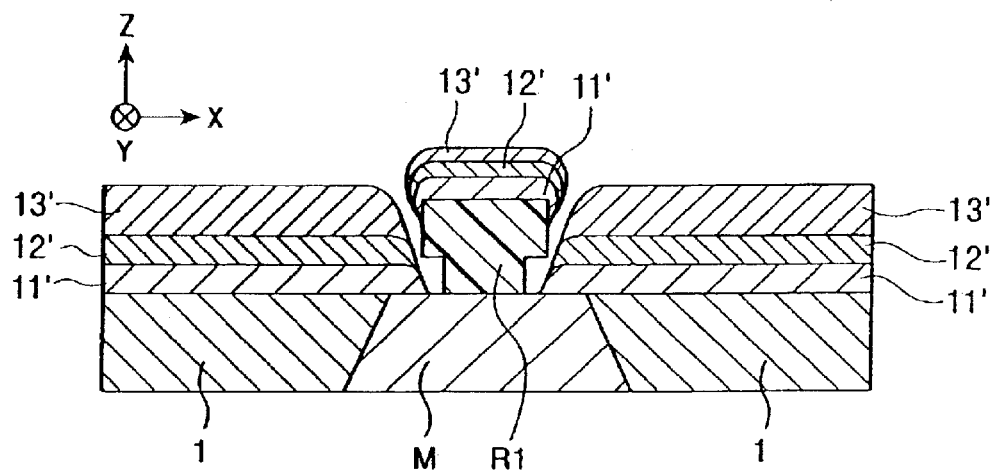
FIG. 5 is a schematic cross-sectional view showing a step subsequent to the step shown in FIG. 4 when viewed from the face that opposes a recording medium.
Figure 6:
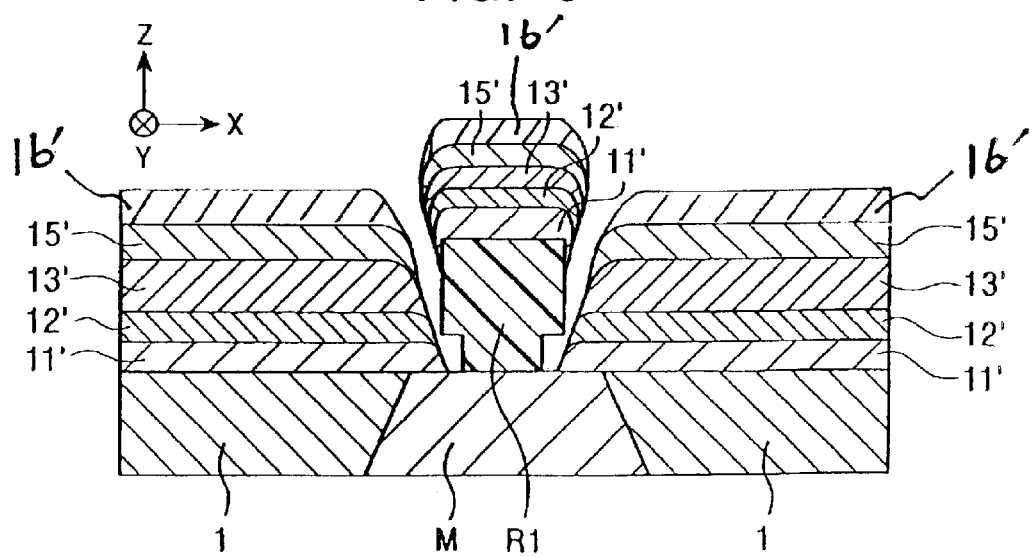
FIG. 6 is a schematic cross-sectional view showing a step subsequent to the step shown in FIG. 5 when viewed from the face that opposes a recording medium.

The process for forming the layers includes forming a β-Ta layer 11' on the magnetoresistive element M, the permanent magnet layers 1, and the resist R1, as shown in FIG. 3. A Cr layer 12', a Au layer 13', a Cr layer 15', and α-Ta layer 16' are sequentially formed on the β-Ta layer 11', as shown in FIGS. 4 to 6. Excess portions of the thin film electrode layers that are inside the track width region Tw are then removed along with the resist R1 to obtain the thin-film electrode layers E1 shown in FIG. 1.

Second Embodiment

Figure 7:
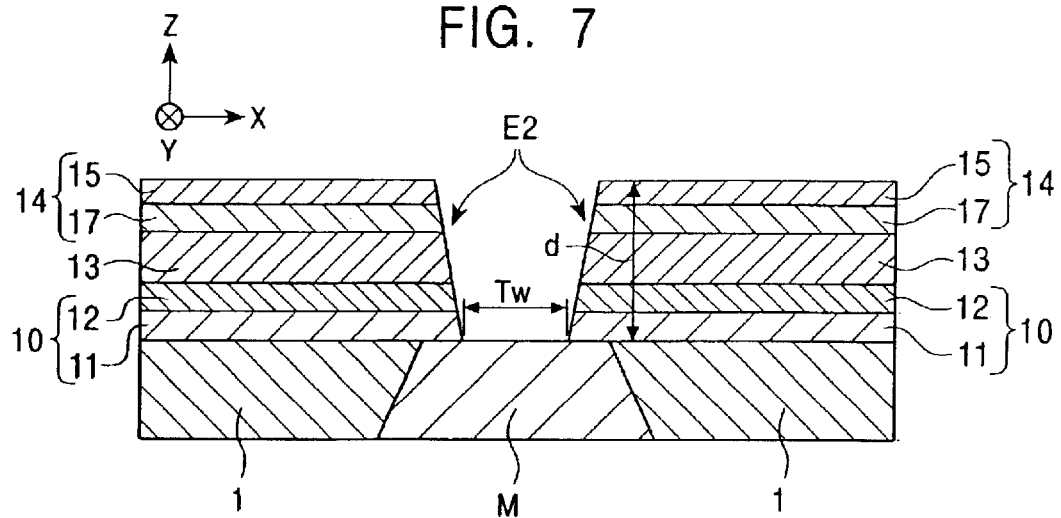
FIG. 7 is a schematic cross-sectional view of the structure of thin-film electrode layers according to a second embodiment of the present invention when viewed from the face that opposes a recording medium.

FIG. 7 is a schematic cross-sectional view showing the structure of thin-film electrode layers E2 according to a second embodiment of the present invention viewed from the face opposing a recording medium. The second embodiment differs from the first embodiment in that the protective layer 14 is constituted from a β-Ta sublayer 17 and a Cr sublayer 15. Other structures are the same as those of the first embodiment. In other words, the second embodiment also has an electrode structure formed by stacking the first base sublayer 11, the second base sublayer 12, and the main conductive layer 13. In FIG. 7, the constituent elements are substantially the same as those of the first embodiment and are represented by the same reference characters.

The thin-film electrode layers E2 are comprised of a first base sublayer 11 composed of β-Ta, a second base sublayer 12 composed of Cr, a main conductive layer 13 composed of Au, a β-Ta sublayer 17, and a Cr sublayer 15, stacked in that order. The Cr sublayer 15 prevents smearing of the main conductive layer 13, and the β-Ta sublayer 17 decreases the resistance of the Cr sublayer 15. The protective layer 14 constituted from the β-Ta sublayer 17 and the Cr sublayer 15 effectively prevents smearing of the main conductive layer 13 and decreases the resistance of the thin-film electrode layer E2 compared to when the protective layer 14 is constituted only from the Cr sublayer 15.

The process for forming the thin-film electrode layers E2 is now described. FIGS. 8 to 15 are schematic cross-sectional views showing the steps of forming the thin-film electrode layers E2 when viewed from the face opposing a recording medium.

Figure 8:
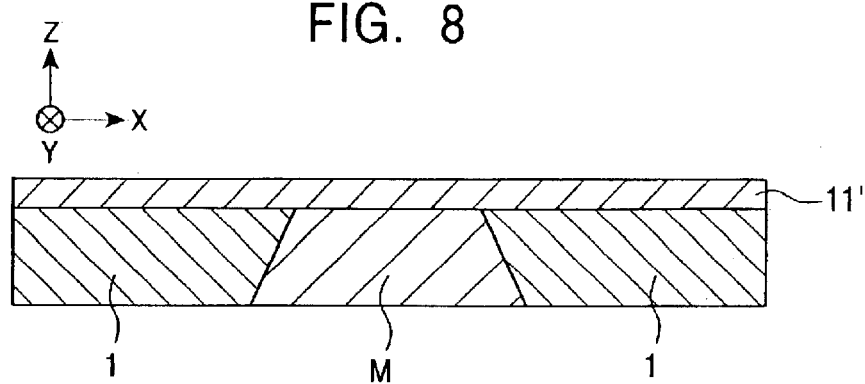
FIG. 8 is a schematic cross-sectional view showing a step of a method for making the thin-film electrode layers shown in FIG. 7 when viewed from the face that opposes a recording medium.
Figure 9:
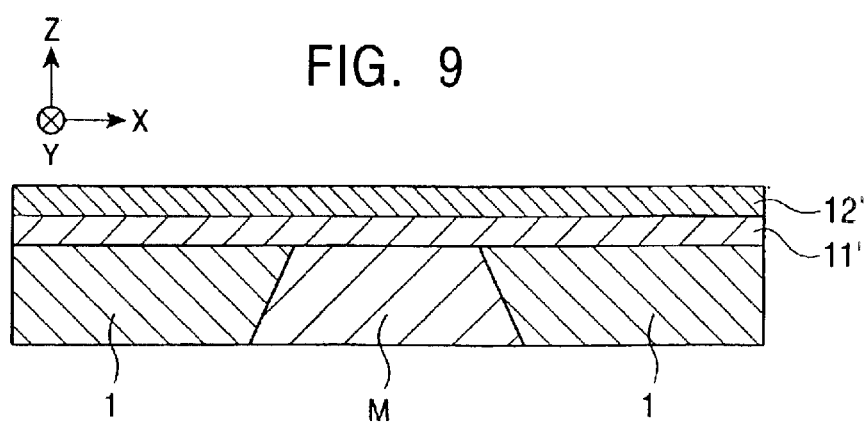
FIG. 9 is a schematic cross-sectional view showing a step subsequent to the step shown in FIG. 8 when viewed from the face that opposes a recording medium.
Figure 10:
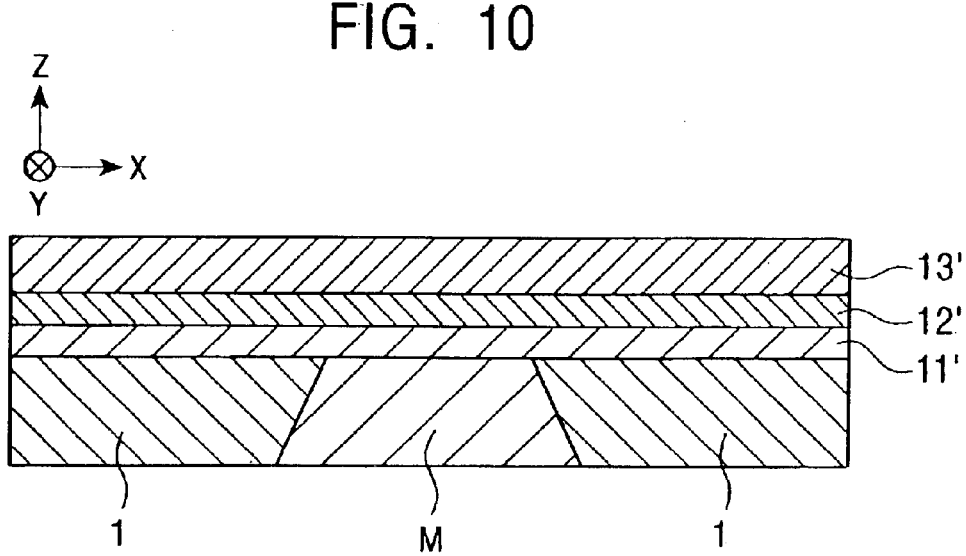
FIG. 10 is a schematic cross-sectional view showing a step subsequent to the step shown in FIG. 9 when viewed from the face that opposes a recording medium.
Figure 11:
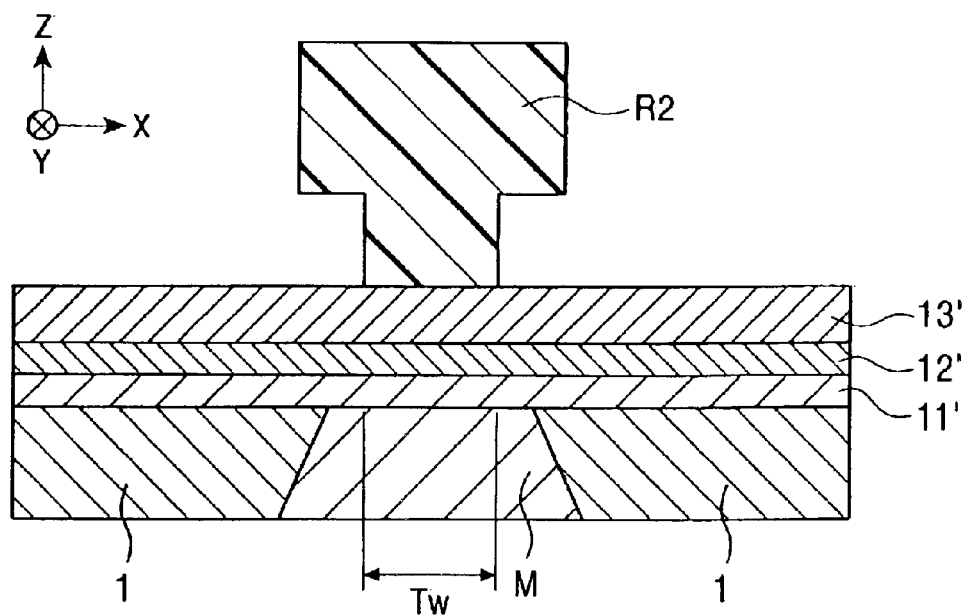
FIG. 11 is a schematic cross-sectional view showing a step subsequent to the step shown in FIG. 10 when viewed from the face that opposes a recording medium.
Figure 12:
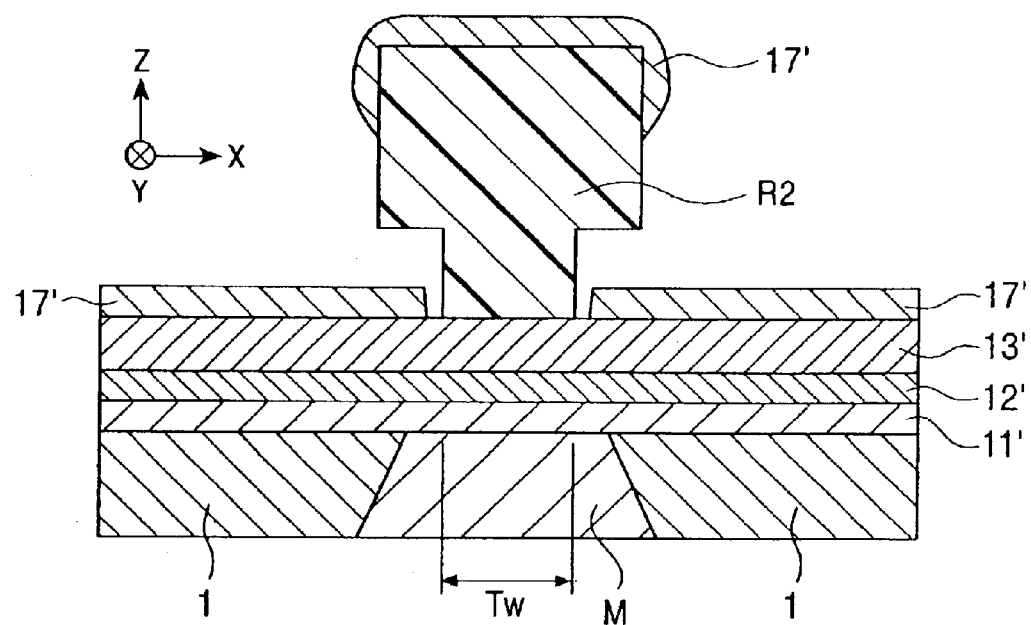
FIG. 12 is a schematic cross-sectional view showing a step subsequent to the step shown in FIG. 11 when viewed from the face that opposes a recording medium.
Figure 13:
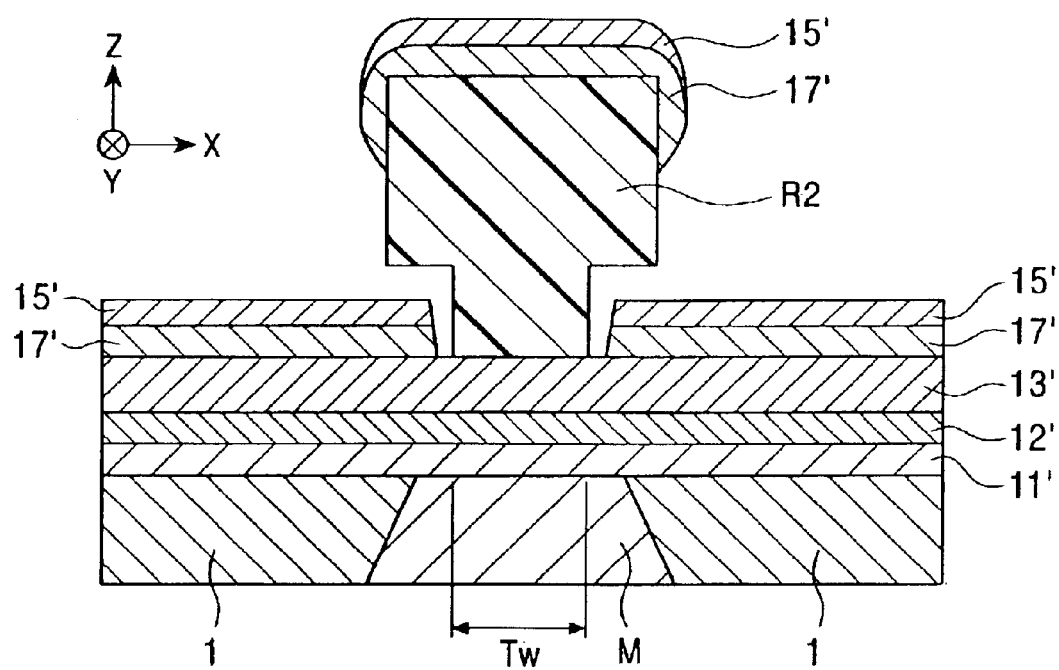
FIG. 13 is a schematic cross-sectional view showing a step subsequent to the step shown in FIG. 12 when viewed from the face that opposes a recording medium.
Figure 14:
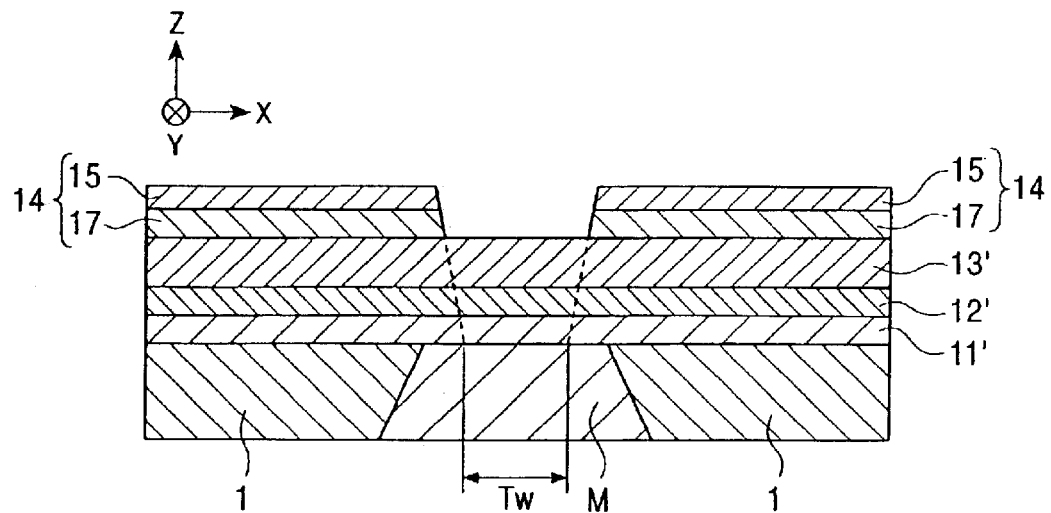
FIG. 14 is a schematic cross-sectional view showing a step subsequent to the step shown in FIG. 13 when viewed from the face that opposes a recording medium.

First, the β-Ta layer 11' is formed on the entire surface of the magnetoresistive element M and the permanent magnet layer 1, as shown in FIG. 8. The Cr layer 12' is formed on the β-Ta layer 11', as shown in FIG. 9, and the Au layer 13' is formed on the Cr layer 12', as shown in FIG. 10. The protective layer 14 is then formed on the Au layer 13' at regions outside the track width region Tw by a lift-off process. In particular, a resist R2 having an reversed shape of the protective layer to be formed is formed on the Au layer 13', as shown in FIG. 11. The β-Ta sublayer 17' is formed on the Au layer 13' and the resist R2, as shown in FIG. 12 and the Cr sublayer 15' is formed on the β-Ta sublayer 17' and the resist R2, as shown in FIG. 13. Excess portions of the β-Ta sublayer 17 and the Cr sublayer 15, i.e., the portions inside the track width region Tw, are then removed along with the resist R2 to obtain the protective layer 14 constituted from the β-Ta sublayer 17 and the Cr sublayer 15 shown in FIG. 14.

Figure 15:
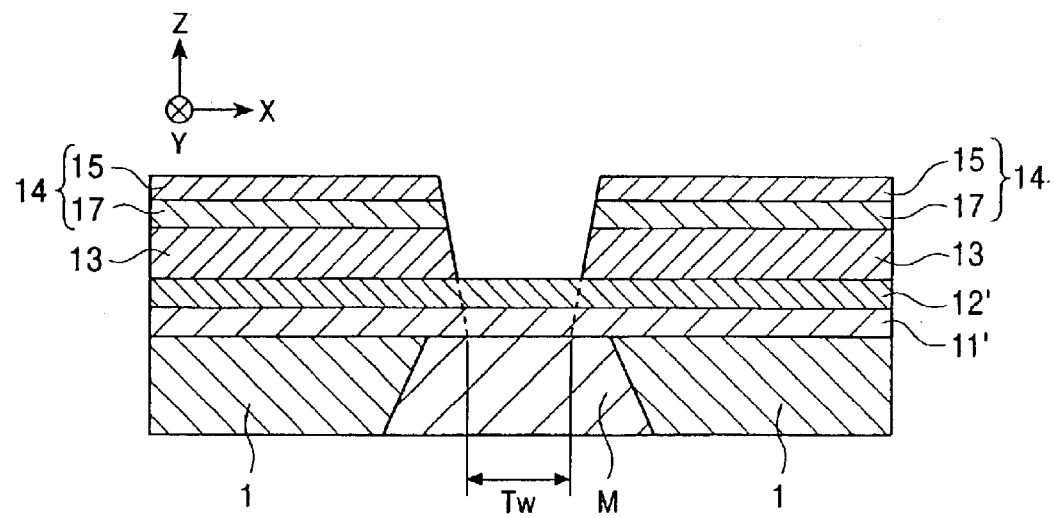
FIG. 15 is a schematic cross-sectional view showing a step subsequent to the step shown in FIG. 14 when viewed from the face that opposes a recording medium.

Next, reactive ion etching (RIE) is performed using the protective layer 14 as a mask to remove the excess portions, i.e., the portions inside the track width region Tw, of the Au layer 13' to obtain the main conductive layer 13 shown in FIG. 15. For example, $C_3F_4$ and Ar is used in RIE of this embodiment. In RIE, the Cr layer 12', i.e., an EM inhibiting layer, functions as an etching stopper. In other words, RIE exposes the Cr layer 12' within the track width region Tw where the Au layer 13' is removed by RIE. Subsequently, excess portions, i.e., the portions inside the track width region Tw, of the Cr layer 12' and the β-Ta layer 11' are removed by ion milling so as to obtain the second base sublayer 12 and the first base sublayer 11, and the thin-film electrode layers E2 shown in FIG. 7.

It is possible to form the thin-film electrode layers E2 by the lift-off process of the first embodiment. However, the end portions of the thin-film electrode layers become tapered, and the resulting lead overlaid structure cannot sufficiently reduce the resistance. When the thin-film electrode layers E2 are formed by the combination of RIE and ion milling, each end portion of the thin-film electrode layer E2 connecting to the magnetoresistive element M can have a sufficient thickness d, and the layers at the end portions can be sufficiently adhered to each other. Moreover, the lead overlaid structure can significantly reduce the resistance, and the EM resistance of the thin-film electrode layers E2 can be further increased.

Third Embodiment

Figure 16:
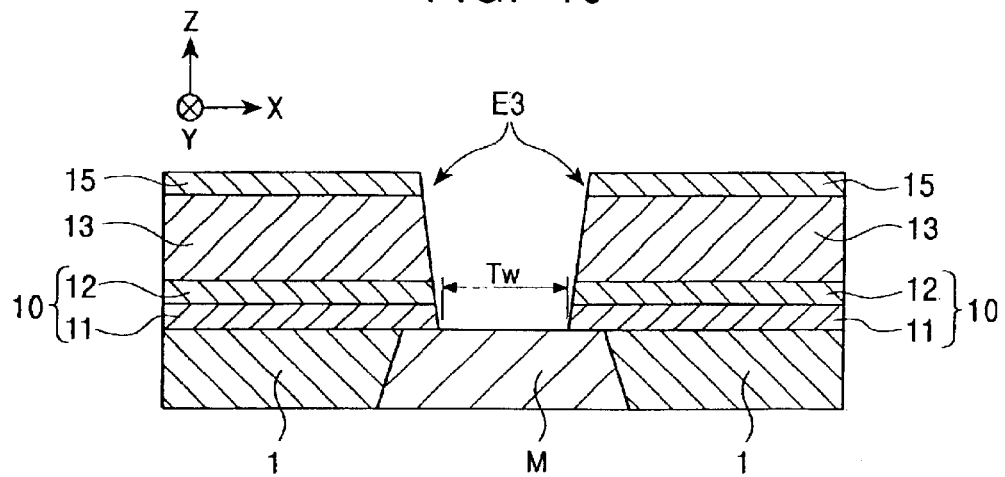
FIG. 16 is a schematic cross-sectional view of the structure of thin-film electrode layers according to a third embodiment of the present invention when viewed from the face that opposes a recording medium.

FIG. 16 is a schematic cross-sectional view showing the structure of thin-film electrode layers E3 according to a third embodiment of the present invention viewed from the face opposing a recording medium. The third embodiment is substantially the same as the first embodiment except that the protective layer 14 is comprised of only the Cr sublayer 15. In FIG. 16, the constituent elements are substantially the same as those of the first embodiment and are represented by the same reference characters.

The thin-film electrode layers E3 are comprised of a first base sublayer 11 composed of β-Ta, a second base sublayer 12 composed of Cr, a main conductive layer 13 composed of Au, and a protective layer 14 comprised of a Cr sublayer 15, stacked in that order on the magnetoresistive element M and the permanent magnet layers 1. Smearing of the main conductive layer 13 can be effectively prevented even when the protective layer 14 is constituted from only the Cr sublayer 15.

The thin-film electrode layer E3 may be prepared by the lift-off process only, as in the first embodiment, or by the combination of RIE and ion milling, as in the second embodiment. When only the lift-off process is used, the thin-film electrode layers E3 may be prepared by the steps shown in FIGS. 2 to 6. When the thin-film electrode layers E3 are formed by the combination of RIE and ion milling, the steps shown in FIGS. 8 to 12, 14, and 15 are performed. FIG. 16 shows the thin-film electrode layers E3 formed by the combination of RIE and ion milling.

Fourth Embodiment

Figure 17:
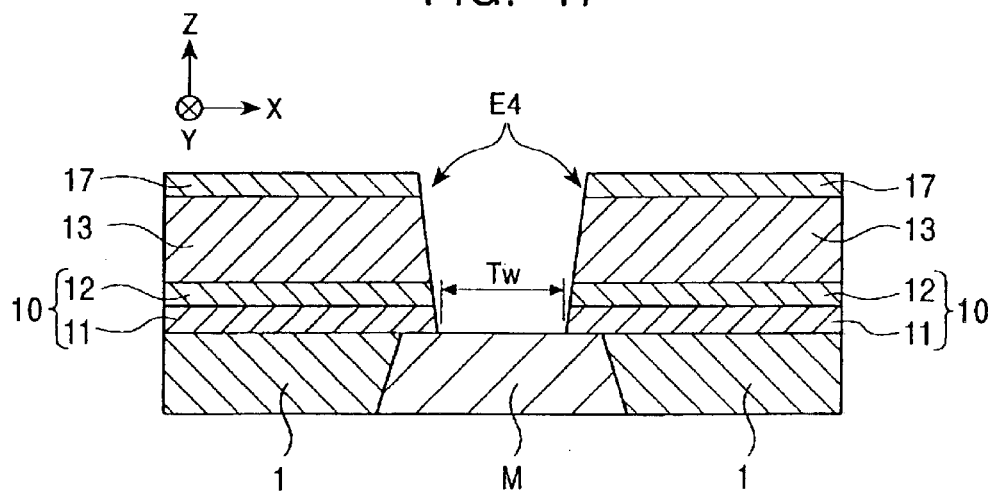
FIG. 17 is a schematic cross-sectional view of the structure of thin-film electrode layers according to a fourth embodiment of the present invention when viewed from the face that opposes a recording medium.

FIG. 17 is a schematic cross-sectional view showing the structure of thin-film electrode layers E4 according to a fourth embodiment of the present invention viewed from the face opposing a recording medium. The fourth embodiment is the same as the first embodiment except that the protective layer 14 is comprised of only the β-Ta sublayer 17. In FIG. 17, the constituent elements are substantially the same as those of the first embodiment and are represented by the same reference characters.

The thin-film electrode layers E4 are comprised of a first base sublayer 11 composed of β-Ta, a second base sublayer 12 composed of Cr, a main conductive layer 13 composed of Au, and a protective layer 14 constituted from a β-Ta sublayer 17 stacked in that order on the magnetoresistive element M and the permanent magnet layers 1. Smearing of the main conductive layer 13 can be effectively prevented even when the protective layer 14 is constituted from only the β-Ta sublayer 17.

The thin-film electrode layers E4 are formed by the same lift-off process of the first embodiment. In other words, after performing the steps shown in FIGS. 2 to 5, the β-Ta sublayer 17' is formed on the Au layer 13', and excess portions, i.e., the portions inside the track width region Tw, of the thin-film electrode layers are removed along with the resist 1 so as to obtain the thin-film electrode layers E4 shown in FIG. 17. Note that it is possible to form the thin-film electrode layers E4 by the combination of RIE and ion milling as in the second and third embodiments. In such a case, the β-Ta sublayer 17, which is to be the topmost layer of the thin-film electrode layer E4, is formed to have a predetermined thickness so that the β-Ta sublayer 17 is not completely removed during RIE and ion milling.

The number of the manufacturing steps can be decreased and the production efficiency can be enhanced when the protective layer 14 has a single layer structure as in the third and fourth embodiments compared with the first and second embodiments.

Although the first to fourth embodiments of the present invention described above involve permanent magnet bias thin-film magnetic heads, the thin-film electrode layers of the present invention may be incorporated into antiferromagnetic bias thin film heads.

Fifth Embodiment

FIGS. 18 to 25 show the fifth embodiment of the present invention in which the thin-film electrode layers E are incorporated in an antiferromagnetic bias thin-film head. The antiferromagnetic bias thin film head includes a magnetoresistive element M, thin-film electrode layers E5 for supplying current to the magnetoresistive element M, and an antiferromagnetic bias layer 2 disposed on the magnetic field sensing layer of the magnetoresistive element M. The antiferromagnetic bias layer 2 defines the track width region Tw, and the thin-film electrode layers E are formed on the antiferromagnetic bias layer 2. The antiferromagnetic bias layer 2 is composed of an antiferromagnetic X-Mn alloy, where X is at least one element selected from the group consisting of Pt, Ru, Rh, Ir, Pd, and Os. An example thereof is a PtMn alloy. Although not shown in the drawing, an insulating layer is formed on the top of the thin-film electrode layer E5, and an upper shield layer is formed on this insulating layer. Moreover, another insulating layer is formed on the bottom of the thin-film electrode layer E5, and a lower shield layer is formed on this insulating layer, although this also is not shown.

Figure 18:
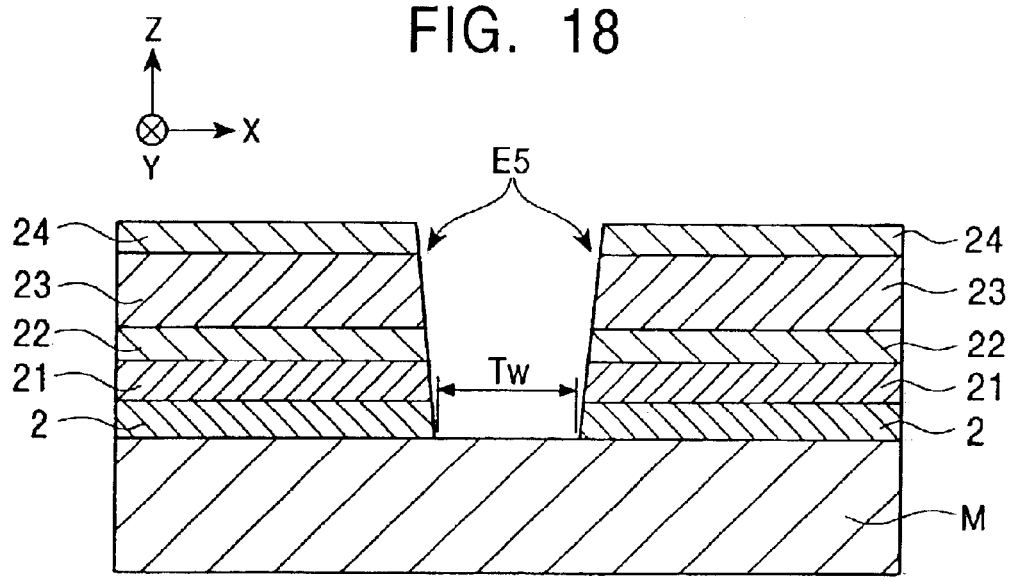
FIG. 18 is a schematic cross-sectional view of the structure of thin-film electrode layers according to a fifth embodiment of the present invention when viewed from the face that opposes a recording medium.

FIG. 18 is a schematic cross-sectional view showing the structure of the thin-film electrode layer E5 according to a fifth embodiment of the present invention viewed from the face opposing a recording medium. Referring to FIG. 18, the thin-film electrode layer E5 is comprised of a first base sublayer 21 composed of β-Ta, a second base sublayer 22 composed of Cr, a main conductive layer 23 composed of Au, and a protective layer 24 composed of Cr. The elements of the thin-film electrode layer E5 are the same as those in the fourth embodiment.

Figure 19:
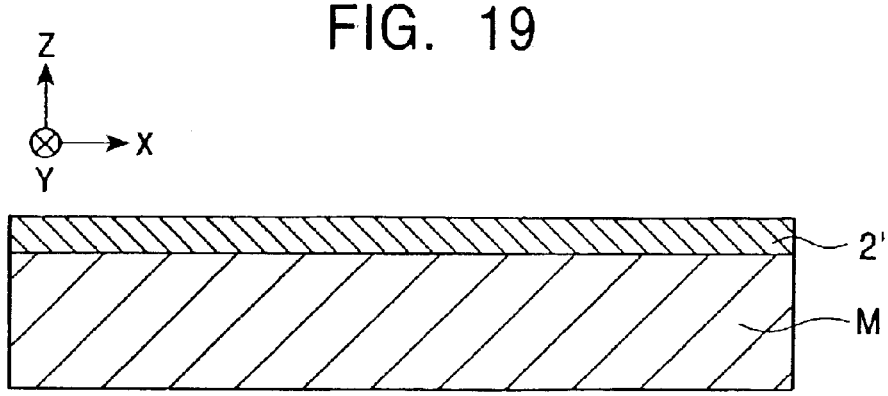
FIG. 19 is a schematic cross-sectional view showing a step of a method for making the thin-film electrode layers shown in FIG. 18 when viewed from the face that opposes a recording medium.

The process for forming the thin-film electrode layer E5 will now be described. FIGS. 19 to 25 are the schematic cross-sectional views of the steps for forming the thin-film electrode layers E5 viewed from the face opposing a recording medium. Referring to FIG. 19, a PtMn alloy layer 2' is formed to cover the entire surface of the magnetoresistive element M.

Figure 20:
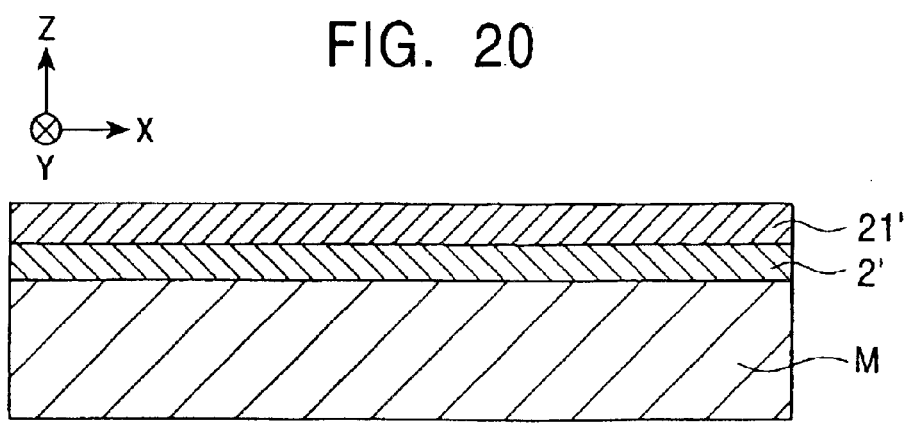
FIG. 20 is a schematic cross-sectional view showing a step subsequent to the step shown in FIG. 19 when viewed from the face that opposes a recording medium.
Figure 21:
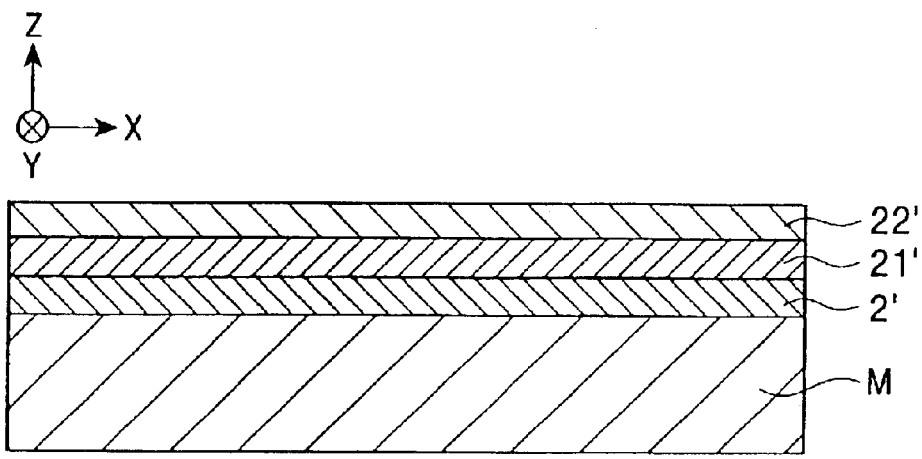
FIG. 21 is a schematic cross-sectional view showing a step subsequent to the step shown in FIG. 20 when viewed from the face that opposes a recording medium.
Figure 22:
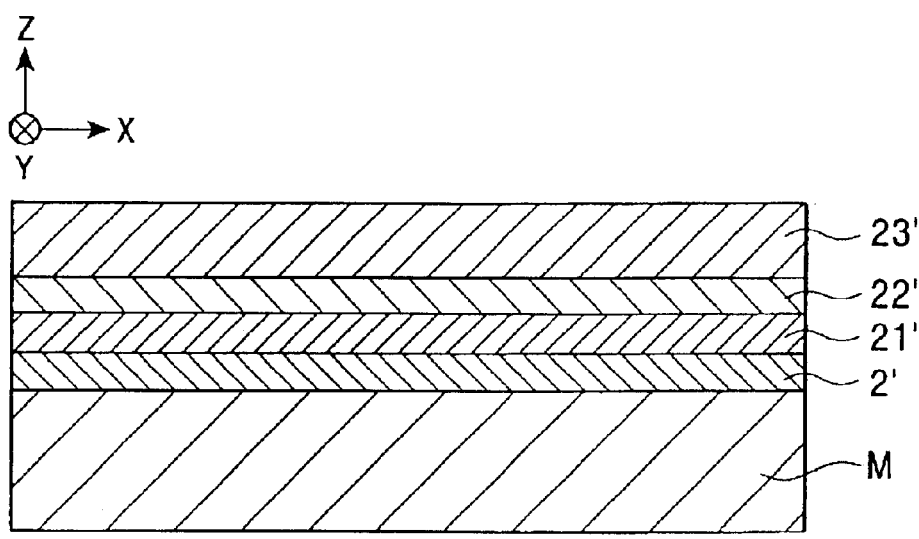
FIG. 22 is a schematic cross-sectional view showing a step subsequent to the step shown in FIG. 21 when viewed from the face that opposes a recording medium.
Figure 23:
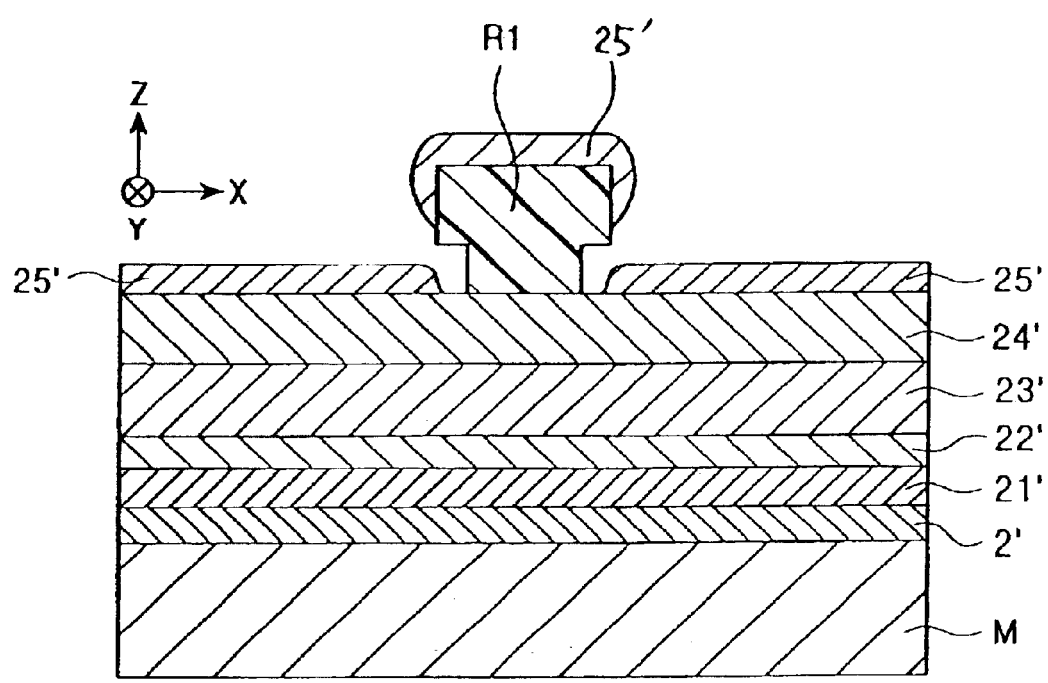
FIG. 23 is a schematic cross-sectional view showing a step subsequent to the step shown in FIG. 22 when viewed from the face that opposes a recording medium.

Next, as shown in FIG. 20, a β-Ta layer 21', which is the precursor of the first base sublayer 21, is formed on the PtMn alloy layer 2'. As shown in FIG. 21, a Cr layer 22', which is the precursor of the second base sublayer 22, is formed on the β-Ta layer 21'. Next, as shown in FIG. 22, a Au layer 23' is formed on the Cr layer 22', and a β-Ta layer 24', which is the precursor of the protective layers 24, is formed on the Au layer 23', as shown in FIG. 23. Since the β-Ta layer 24' is used as a mask during a subsequent ion milling step, the thickness of the β-Ta layer 24' must be large enough so that the β-Ta layer 24' is not completely removed by the ion milling step. Subsequently, a pattern R1 for forming a track width region Tw of the magnetoresistive element M is formed, and a mask layer 25' composed of Cr is formed on the β-Ta layer 24' at regions outside the track width region Tw, as shown in FIG. 23. The mask layer 25 is formed by a lift-off process.

Figure 24:
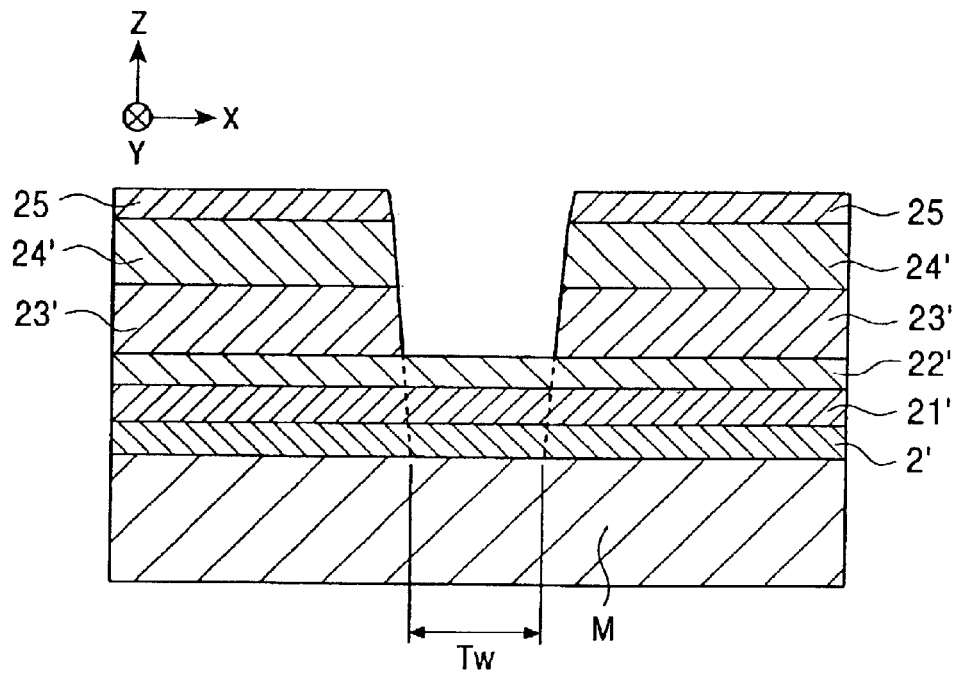
FIG. 24 is a schematic cross-sectional view showing a step subsequent to the step shown in FIG. 23 when viewed from the face that opposes a recording medium.
Figure 25:
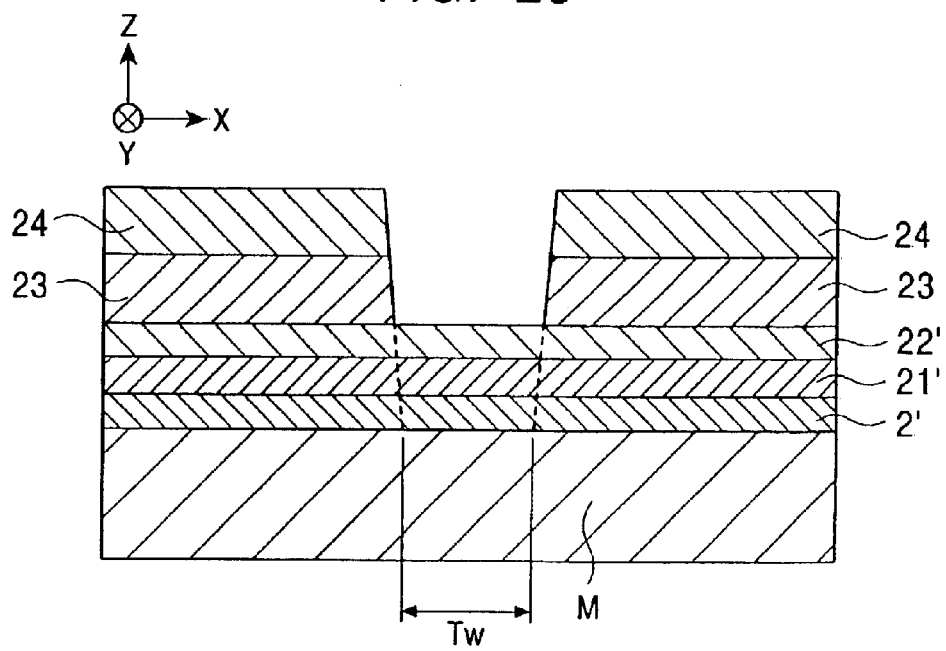
FIG. 25 is a schematic cross-sectional view showing a step subsequent to the step shown in FIG. 24 when viewed from the face that opposes a recording medium.

Using the mask layer 25', RIE is performed so as to remove excess portions, i.e., the portions inside the track width region Tw, of the β-Ta layer 24' and the Au layer 23' to obtain protective layers 24 and main conductive layers 23 shown in FIG. 24. During RIE, the Cr layer 22', which is the precursor of the second base sublayers 22, functions as an etching stopper. In other words, RIE exposes the Cr layer 22' in the region where the Au layer 23' is removed, i.e., inside the track width region Tw. It should be noted that the mask layer 25 may be removed during RIE as shown in FIG. 25.

Subsequently, ion milling is performed using the protective layers 24 as a mask so as to remove excess portions, i.e., the portions inside the track width region Tw, of the Cr layer 22', the β-Ta layer 21', and the PtMn alloy layer 2' so as to form the second base sublayers 22, the first base sublayers 21, and the antiferromagnetic bias layers 2. Thus, the thin-film electrode layers E5 shown in FIG. 18 are formed.

Although the protective layers 24 have a single-layer structure composed of β-Ta in the thin-film electrode layers E5 of this embodiment, various modifications are possible. For example, the protective layers 24 may be a composite of a β-Ta sublayer and a Cr sublayer, as in the second embodiment, or may be a single Cr layer, as in the third embodiment. When each of the protective layers 24 is a composite of a β-Ta sublayer and a Cr sublayer or is a single Cr layer, the thickness of the Cr mask layer 25 must be sufficiently large so that the Cr mask layer 25 is not completely removed by RIE and ion milling.

According to the thin magnetic heads incorporating thin-film electrode layers E1 to E5 of first to fifth embodiments can detect voltage changes due to resistance change in the magnetoresistive elements M and can thus detect leakage magnetic fields from recording media based on the detected voltage changes.

EXAMPLES

FIGS. 26 to 28 are graphs showing the experimental results of EM characteristics of thin-film electrode layers. The EM characteristics testing is an accelerated test that measures a change in resistance of the thin-film electrode layers at a current of 4.5 mA in an 135° C. atmosphere. In FIGS. 26 to 28, the ordinate indicates the percent resistance change (%) and the abscissa indicates the stresstime in hours (h). Note that the resistance change is indicated as a change relative to reference resistance 0 (%) of the thin-film electrode layers at a zero stress hour.

Example 1

FIG. 26 shows the results of the EM characteristics testing using Samples S1 to S5 of the thin-film electrode layers E1 shown in FIG. 1. FIG. 26 shows that curves representing the resistance change are substantially flat, and that the resistance changes are approximately 2% at most even after 40 hours of stresstime.

Example 2

FIG. 27 shows the results of the EM characteristics testing using Samples S6 to S10 of the thin-film electrode layers E4 shown in FIG. 17. FIG. 27 shows that although some degree of variation is observed among the samples, the resistance changes are approximately 6% at most after 40 hours of stresstime, for example.

Comparative Example

Figure 29:
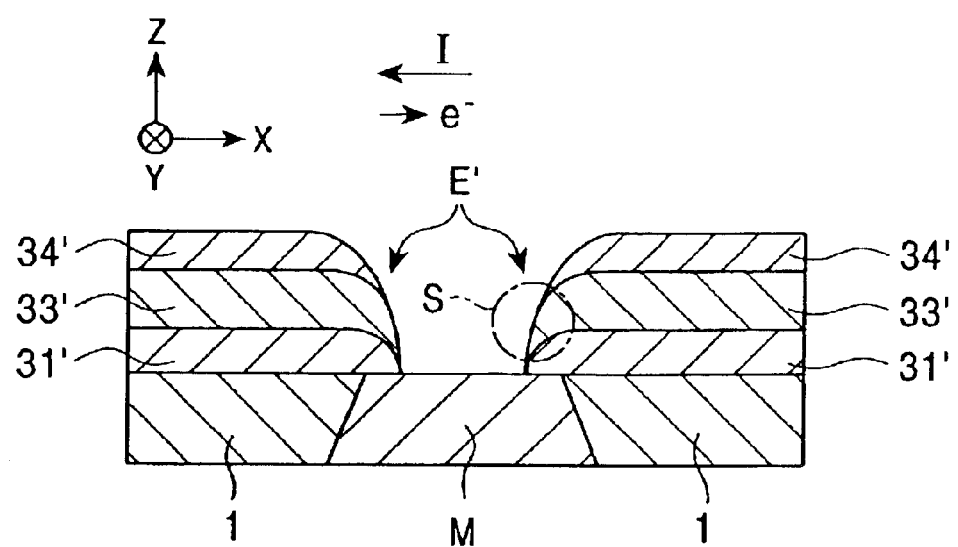
FIG. 29 is a schematic cross-sectional view of conventional thin-film electrode layers when viewed from a face that opposes a recording medium.

FIG. 28 shows the results of the EM characteristics testing using thin-film electrode layers E' having the conventional structure shown in FIG. 29. Each of the thin-film electrode layer E' includes a first Ta layer 31', which functions as a base layer; a Au layer 33', which functions as a main conductive layer; and a second Ta layer 34', which functions as a protective layer, stacked in that order on a magnetoresistive element M and a permanent magnet layer 1. As shown in FIG. 28, the resistance change in the thin-film electrode layers E' increases in proportion to the stresstime. For example, the resistance change at a stresstime of 40 hours is 3% to 13%.

FIGS. 26 and 28 clearly demonstrate that the resistance change in the thin-film electrode layers of EXAMPLES 1 and 2 are effectively prevented from increasing compared with that of COMPARATIVE EXAMPLE. Thus, the thin-film electrode layers in accordance with the present invention have superior EM resistance.

Note that the thin-film electrode layers of the present invention are not limited to the above-described embodiments. The thin-film electrode layers do not necessary have the lead overlaid structure. Moreover, an anisotropic magnetoresistive (AMR) element utilizing anisotropic magnetoresistive effects or a giant magnetoresistive (GMR) element utilizing giant magnetoresistive effects can be employed as the magnetoresistive element M.

What is claimed is:

1. A thin-film electrode layer comprising:
   a base layer including a first base sublayer including β-Ta and a second base sublayer including Cr;
   a main conductive layer including Au; and
   a protective layer,
   wherein the second base sublayer is disposed between the first base sublayer and the main conductive layer.

2. The thin-film electrode layer according to claim 1, wherein the protective layer includes a Cr sublayer and an α-Ta sublayer, stacked in that order on the main conductive layer.

3. The thin-film electrode layer according to claim 1, wherein the protective layer includes a β-Ta sublayer and a Cr sublayer, stacked in that order on the main conductive layer.

4. The thin-film electrode layer according to claim 1, wherein the protective layer is one of a Cr layer and a β-Ta layer.

5. A thin-film magnetic head comprising:
   the thin-film electrode layers according to claim 1; and
   a magnetoresistive element,
wherein an electric current is supplied to the magnetoresistive element via the thin-film electrode layers.

6. The thin-film magnetic head according to claim 5, further comprising two permanent magnet layers at two sides of the magnetoresistive element, and the thin-film electrode layers overlay at feast the permanent magnet layers.

7. The thin-film magnetic head according to claim 5, further comprising antiferromagnetic bias layers directly on the top of the magnetoresistive element, and the thin-film electrode layers are disposed on the antiferromagnetic bias layers.

* * * * *

UNITED STATES PATENT AND TRADEMARK OFFICE
CERTIFICATE OF CORRECTION

PATENT NO. : 7,102,858 B2  Page 1 of 1
APPLICATION NO. : 10/369058
DATED : September 5, 2006
INVENTOR(S) : Akira Takahashi et al.

It is certified that error appears in the above-identified patent and that said Letters Patent is hereby corrected as shown below:

On the Title Page

Column 2, line 4, under "U.S. PATENT DOCUMENTS", item 56 after "6,359,760" delete "B1" and substitute --B2-- in its place.

In the Claims

Columns 11-12, in claim 6, line 2, after "electrode layers overlay at" delete "feast" and substitute --least-- in its place.

Signed and Sealed this

Seventeenth Day of April, 2007

JON W. DUDAS
*Director of the United States Patent and Trademark Office*